(12) United States Patent
Lu et al.

(10) Patent No.: US 8,031,708 B2
(45) Date of Patent: Oct. 4, 2011

(54) METHODS AND APPARATUS FOR DUAL-TONE MULTI-FREQUENCY SIGNAL ANALYSIS WITHIN A MEDIA OVER INTERNET PROTOCOL NETWORK

(75) Inventors: Xiaomin Lu, Chantilly, VA (US); Bruce Mattie, Germantown, MD (US); Simon Arthur Oakley, Gaithersburg, MD (US); Christopher Michael Sherwin, Rockville, MD (US); David Elliott Sturtevant, Reston, VA (US)

(73) Assignee: Genband US LLC, Plano, TX (US)

( * ) Notice: Subject to any disclaimer, the term of this patent is extended or adjusted under 35 U.S.C. 154(b) by 486 days.

(21) Appl. No.: 11/965,272

(22) Filed: Dec. 27, 2007

(65) Prior Publication Data
US 2009/0168769 A1 Jul. 2, 2009

(51) Int. Cl.
*H04L 12/28* (2006.01)
(52) U.S. Cl. ........................ 370/389; 370/392
(58) Field of Classification Search .................. None
See application file for complete search history.

(56) References Cited

U.S. PATENT DOCUMENTS

| | | | |
|---|---|---|---|
| 5,794,201 A | 8/1998 | Nejime et al. | |
| 6,259,691 B1 | 7/2001 | Naudus | |
| 6,560,331 B1 * | 5/2003 | Cooklev et al. | 379/283 |
| 7,039,044 B1 * | 5/2006 | Whitfield et al. | 370/356 |
| 7,082,143 B1 | 7/2006 | LeBlanc et al. | |
| 7,209,473 B1 | 4/2007 | Mohaban et al. | |
| 7,447,193 B1 | 11/2008 | Ehlinger | |
| 2001/0021186 A1 | 9/2001 | Ono et al. | |
| 2002/0176404 A1 | 11/2002 | Girard | |
| 2003/0112796 A1 * | 6/2003 | Kwan | 370/352 |
| 2004/0001482 A1 | 1/2004 | Yeom | |
| 2004/0246949 A1 | 12/2004 | Cannon | |
| 2005/0083912 A1 | 4/2005 | Afshar et al. | |
| 2006/0008074 A1 * | 1/2006 | Itoh | 379/386 |
| 2006/0083220 A1 * | 4/2006 | Mekala et al. | 370/352 |
| 2007/0076710 A1 | 4/2007 | Khan | |
| 2007/0116043 A1 | 5/2007 | MeLampy et al. | |
| 2007/0206580 A1 * | 9/2007 | Silver et al. | 370/356 |

(Continued)

FOREIGN PATENT DOCUMENTS
WO  WO 2009/006367 A2   1/2009

OTHER PUBLICATIONS

Notification of Transmittal of the International Search Report and the Written Opinion of the International Searching Authority, or the Declaration for International Application No. PCT/US2008/088442 (Jun. 26, 2009).

(Continued)

*Primary Examiner* — Chirag Shah
*Assistant Examiner* — Otis L Thompson, Jr.
(74) *Attorney, Agent, or Firm* — Jenkins, Wilson, Taylor & Hunt, P.A.

(57) ABSTRACT

In one embodiment, a method includes receiving a media signal associated with a session established based on a session request. The session request is defined at a session exchange device associated with a media over internet protocol (MoIP) network. The method also includes sending a portion of the media signal to a dual-tone multi-frequency (DTMF) analysis module during a sampling time period after a non-sampling time period.

17 Claims, 7 Drawing Sheets

U.S. PATENT DOCUMENTS

2007/0206735 A1 9/2007 Silver et al.
2008/0137650 A1 6/2008 Kumarasamy et al.
2009/0003315 A1 1/2009 Devdhar et al.

OTHER PUBLICATIONS

Notice of Allowance and Fee(s) Due for U.S. Appl. No. 11/771,270 (May 6, 2011).

Communication of European publication number and information on the application of Article 67(3) EPC for European Application No. 08868490.7 (Sep. 8, 2010).

Communication of European publication number and information on the application of Article 67(3) EPC for European Application No. 08781147.7 (Mar. 10, 2010).

Notification of Transmittal of the International Search Report and the Written Opinion of the International Searching Authority, or the Declaration for International Application No. PCT/US08/68710 (Jun. 11, 2009).

Burger et al., "A Session Initiation Protocol (SIP) Event Package for Key Press Stimulus (KPML)," RFC 4730, pp. 1-56 (Nov. 2006).

Schulzrinne et al., "RTP Payload for DTMF Digits, Telphony Tones and Telephony Signals," RFC 2833, pp. 1-29 (May 2000).

* cited by examiner

FIG. 7

METHODS AND APPARATUS FOR DUAL-TONE MULTI-FREQUENCY SIGNAL ANALYSIS WITHIN A MEDIA OVER INTERNET PROTOCOL NETWORK

BACKGROUND

Embodiments of the invention relate generally to dual-tone multi-frequency signal processing, and, in particular, to methods and apparatus for dual-tone multi-frequency (DTMF) signal processing within a media over Internet Protocol (MoIP) network.

Dual-tone multi-frequency signals can be transmitted between endpoints via a media signal within a MoIP network based on one or more media-layer protocols associated with a variety of conventions and standards. For example, several known public and proprietary media-layer protocol configurations can be used to transmit DTMF signals via a media signal. Typically, network equipment and/or network software vendors support only a small subset of media-layer protocols that can be used to transmit DTMF signals. This poses a significant interoperability challenge to not only network equipment/software providers, but also to service providers who integrate network equipment from various vendors to implement services and applications. Accordingly, detecting DTMF signals in real-time (e.g., as they are being transmitted and/or received) so that the interoperability challenges can be resolved may be desirable. Known detection techniques, however, can be computationally expensive and unscalable despite advances in hardware/software processing capabilities. Thus, a need exists for methods and apparatus for processing media signals that have information associated with DTMF signals.

SUMMARY OF THE INVENTION

In one embodiment, a method includes receiving a media signal associated with a session established based on a session request. The session request is defined at a session exchange device associated with a media over internet protocol (MoIP) network. The method also includes sending a portion of the media signal to a dual-tone multi-frequency (DTMF) analysis module during a sampling time period after a non-sampling time period.

DETAILED DESCRIPTION

A session exchange device within a media over Internet Protocol (MoIP) network can be configured to analyze, and/or trigger a separate module to analyze, a media signal to determine whether or not a portion of the media signal has information associated with at least a portion of one or more dual-tone multi-frequency (DTMF) signals. The information can define and/or can be used to define the DTMF signal (e.g., textual description, waveform) and can be, for example, associated with (e.g., encoded within) any portion of the media signal. The media signal can include (e.g., can be defined by) a stream of packets (e.g., Internet Protocol (IP) packets) and any portion of the packets can include the DTMF signal information. For example, the DTMF signal can be encoded within a payload of a packet associated with the media signal or described in a header portion of a packet associated with the media signal. Packets associated with the media signal can be configured, for example, based on a protocol (e.g., Real-time Transport Protocol (RTP), G.711 and/or a proprietary IP-media protocol) associated with a media-layer (e.g., layer-3 of the open systems interconnection (OSI) model) of the MoIP network.

DTMF signals are standardized signals (e.g., touch-tone signals) defined by the International Telecommunications Union (ITU) for telephone dialing and other telephony-based applications such as conferencing, voicemail, interactive voice response (IVR) systems, and so forth. A packet that has information associated with (e.g., configured to communicate) at least a portion of a DTMF signal, a DTMF value, multiple DTMF signals, or multiple DTMF values can be referred to as a DTMF packet or as a DTMF-media packet. More details related to the contents of a DTMF packet are described in connection with FIG. 5A. The MoIP network can be, for example, a Voice over Internet Protocol (VoIP) network, a Video over Internet Protocol (VoIP) network, or a Session over Internet Protocol (SoIP) network. A DTMF signal included within (e.g., encoded within) a media signal can be referred to as an inband DTMF signal.

The session exchange device (or one or more modules within the session exchange device) can be configured to analyze a media signal to determine whether or not the media signal has information associated with a DTMF signal or value. This can be referred to as DTMF scanning, DTMF analysis, and/or DTMF monitoring. A media signal that has information associated with a DTMF signal can also be referred to as a media signal that is communicating a DTMF signal or as a media signal that is encoded with a DTMF signal. In some embodiments, DTMF scanning can be performed at the session exchange device using a DTMF analysis module. In some embodiments, the session exchange device can also be configured to determine, based on session-layer parameter values, whether or not a media signal associated with a session should be analyzed by the DTMF analysis module.

In some embodiments, the session exchange device can be configured to analyze a media signal based on a sampling cycle that includes both a sampling time period and a non-sampling time period. The media signal can be analyzed during the sampling time period to determine whether or not a DTMF signal is associated with the media signal. If a portion of a DTMF signal is detected during the sampling time period, the sampling time period can be, for example, increased until an end portion of the DTMF signal is detected.

In some embodiments, the session exchange device can be configured to separate one or more incoming packets associated with the media signal and identified as DTMF packets from non-DTMF packets (e.g., incoming packets not including information associated with a DTMF signal) and to store the DTMF packets in a memory. In some embodiments, the DTMF packets are stored without storing the non-DTMF packets. Signals (e.g., media signals, session layer signals) received at a session exchange device can be referred to as incoming or ingress signals, and signals sent from the session exchange device can be referred to as outgoing or egress signals. Likewise, packets (e.g., DTMF packets, non-DTMF packets) received at a session exchange device can be referred to as incoming or ingress packets, and packets sent from the session exchange device can be referred to as outgoing or egress packets.

Figure 1:
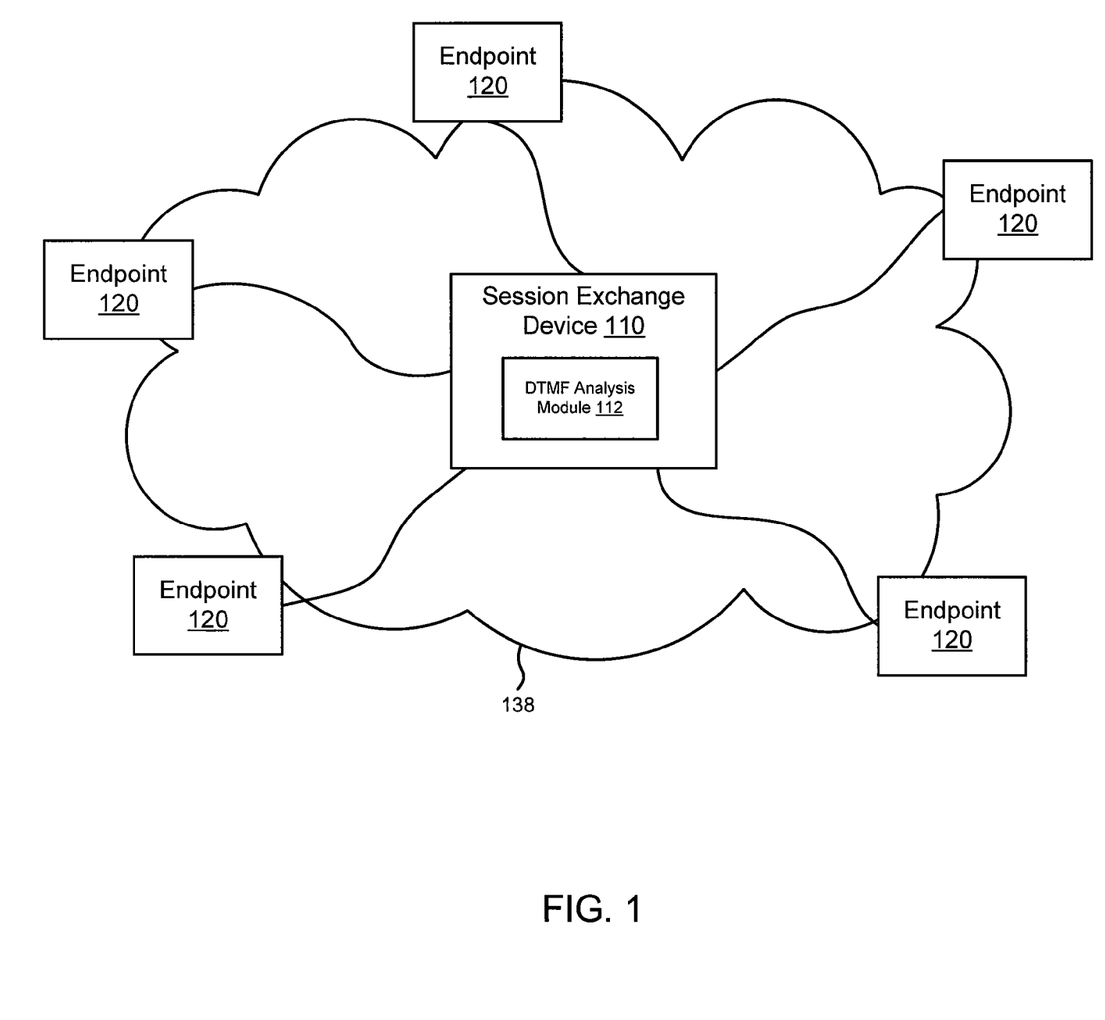
FIG. 1 is a schematic block diagram that illustrates a session exchange device having a dual-tone multi-frequency (DTMF) analysis module configured to analyze a media signal transmitted between endpoints within a media over internet protocol (MoIP) network, according to an embodiment of the invention.

Referring now to the drawings, FIG. 1 is a schematic block diagram that illustrates a session exchange device 110 having a DTMF analysis module 112 configured to analyze a media signal transmitted between endpoints 120 over MoIP network 138, according to an embodiment of the invention. Each of the endpoints 120 can function as a source endpoint and/or as a destination endpoint, and can be an endpoint from the perspective of the session exchange device 110.

The session exchange device 110 can operate as a multi-protocol session exchange device that can be configured to function as an interface device between different endpoints 120 (e.g., networks), for example, at the borders of the MoIP network 138 (e.g., session border controller). In some embodiments, the session exchange device 110 can function as a session border controller (SBC) and/or can be associated with a session border controller (not shown). An SBC can be configured to establish, control, and monitor connections between one or more of the endpoints 120 based on, for example, layer-5 information (e.g., session layer of the OSI model). The SBC can be in communication with a SBC-network controller (not shown) that is a centralized management component that controls, configures, and coordinates the MoIP network 138.

Each of the endpoints 120 can be, for example, a public switched telephone network (PSTN), a broadband network that can provide network access to broadband consumers, an enterprise network, an H.323 network, a session initiation protocol (SIP) softswitch network, a SIP network, an individual phone/computer terminal and/or an access point (e.g., another session exchange device) to another MoIP network (not shown). Although shown as a single MoIP network 138 in this embodiment, the MoIP network 138 can be a collection of one or more MoIP networks, can be associated with a separate MoIP network (not shown), and/or can have more than one wired and/or wireless segment.

The DTMF analysis module 112 is a software-based module (e.g., a set of instructions executable at a processor, a software application) and/or a hardware-based module (e.g., a processor, an application-specific integrated circuit (ASIC), a field programmable gate array (FPGA)) configured to receive (e.g., intercept) at least a portion of a media signal transmitted between any of the endpoints 120. In some embodiments, the DTMF analysis module 112 can be associated with one or more memory components (not shown) and/or one or more processing components (not shown). The DTMF analysis module 112 is configured to determine whether or not the media signal has information associated with at least a portion of a DTMF signal or multiple DTMF signals. In other words, the DTMF analysis module 112 can be configured to determine whether or not a media signal has information associated with (e.g., has information communicating) one or more DTMF signals from a first endpoint 120 and sent to a second endpoint 120 over the MoIP network 138. In some embodiments, the DTMF analysis module 112 can be a software-based digital-signal-processor (DSP) emulator.

Figure 2:
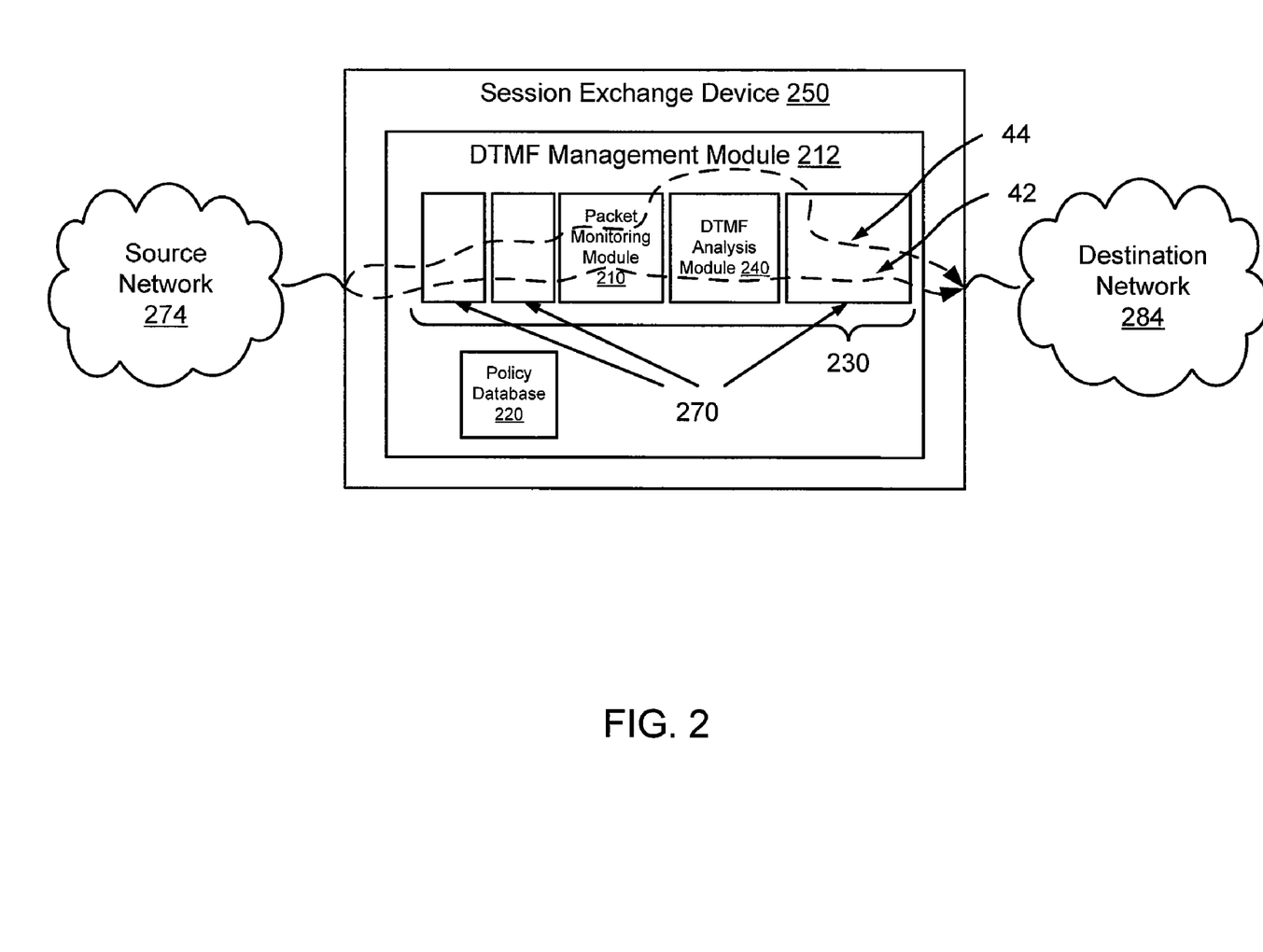
FIG. 2 is a schematic block diagram that illustrates a processing pipeline of a session exchange device including a DTMF analysis module, according to an embodiment of the invention.

FIG. 2 is a schematic block diagram that illustrates a processing pipeline 230 of a session exchange device 250 including a DTMF analysis module 240, according to an embodiment of the invention. The processing pipeline 230 is configured to process media signals received at the session exchange device 250. The processing pipeline 230 can be also be referred to as a media signal processing pipeline 230. The processing pipeline 230 also includes a packet monitoring module 210 and other modules 270 such as, for example, buffering modules, routing modules, and so forth that can be configured to process incoming media signals. In this embodiment, the processing pipeline 230 is included in a DTMF management module 212 that can be a hardware-based module and/or a software-based module.

The DTMF analysis module 240 is a module configured to analyze a media signal to determine whether or not the media signal has information associated with one or more DTMF signals. The packet monitoring module 210 can be configured to determine whether or not the media signal should be analyzed at the DTMF analysis module 240 based on one or more session-layer parameter values associated with the media signal and/or based on one or more policies defined within a policy database 220. The packet monitoring module 210 can be configured to send (e.g., route) one or more media signals to the DTMF analysis module 240 based the determination. The policies can be referred to as DTMF policies and can be accessed by the packet monitoring module 210 from the policy database 220. The DTMF policies can include, for example, one or more conditions (e.g., threshold conditions) and one or more actions to be performed based on whether or not the condition(s) are satisfied.

In some embodiments, for example, the packet monitoring module 210 can be configured to route a media signal so that it is analyzed at the DTMF analysis module 240 based on a condition within a DTMF policy being satisfied (or unsatisfied) and/or based on one or more session-layer parameter values associated with the media signal. The packet monitoring module 210 can also be configured to route a media signal so that it is processed by a portion of the processing pipeline 230 that excludes the DTMF analysis module 240 based on a condition within a DTMF policy being satisfied (or unsatisfied) and/or based on one or more session-layer parameter values associated with the media signal.

For example, two different media signals, media signal 42 and media signal 44, are processed by different portions of the processing pipeline 230, as shown in FIG. 2, based on one or more session layer parameter values associated with each media signal. In this embodiment, the media signals 42 and 44 are transmitted to the session exchange device 250 from source network 274, and then transmitted from the session exchange device 250 to destination network 284. Media signal 42 is sent to the DTMF analysis module 240 in response to a condition within a DTMF policy being satisfied based on one or more session-layer parameter values associated with media signal 42. Media signal 44 is routed through a portion of the processing pipeline 230 that bypasses the DTMF analysis module 240 in response to the condition within the DTMF policy (or a different condition and/or different DTMF policy) being unsatisfied based on one or more session-layer parameter values associated with media signal 44.

Figure 3:
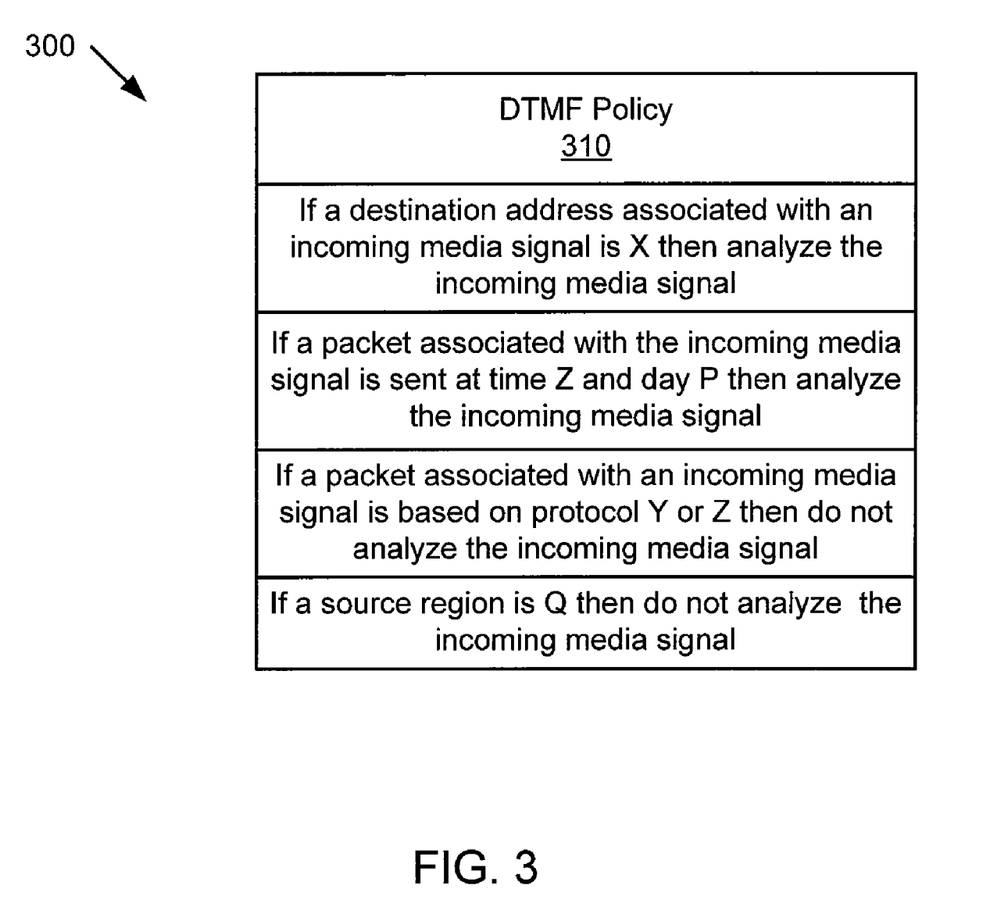
FIG. 3 is a table that illustrates a set of DTMF policies that can be used to determine whether or not an incoming media signal should be analyzed at a DTMF analysis module of a session exchange device, according to an embodiment of the invention.

FIG. 3 is a table 300 that illustrates a set of DTMF policies 310 that can be used to determine whether or not an incoming media signal should be analyzed at a DTMF analysis module of a session exchange device, according to an embodiment of the invention. For example, a DTMF policy 310 included in table 300 indicates that if a destination address (which can be a session-layer parameter) associated with an incoming media signal is X, then the incoming media signal should be analyzed at the DTMF analysis module of the session exchange device. This table 300 illustrates only a small sample of the types of DTMF policies 310 that can be used to determine whether or not a media signal should be analyzed at a DTMF analysis module. As illustrated in table 300 the DTMF policies 310 can have conditions that are based on session-layer parameter values. In some embodiments, the DTMF policies 310 can be based on different types of parameter values such as parameter values related to processing capabilities/limitations of a DTMF analysis module or a session exchange device.

Referring back to FIG. 2, in some embodiments, the DTMF policies can be based on any combination of Boolean logic and/or session-layer parameter values that can be associated with a media signal. For example, session-layer parameter values can be any parameter value associated with a session-layer of a network (e.g., layer-5 of the OSI model). A session-layer parameter value can be defined based on a parameter value below a session-layer of a network (e.g., layer-3 of the OSI model). Session-layer parameter values associated with a DTMF policy can be, for example, a call duration parameter value, a start/end time parameter value, a source endpoint address, a destination endpoint address, a quality-of-service (QoS) parameter value such as a delay parameter value, a media-type parameter value, a media-quality parameter value, a packet-loss parameter value, a packet delay variance (jitter) parameter value, an r-factor parameter value, a time-of-day parameter value, a day-of-the-week parameter value, a number-of-calls parameter value, a route-cost parameter value, a description of an endpoint type (e.g., IP phone, video conferencing device, gateway), and so forth.

Although not shown, each of the media signals 42 and 44 can be associated with different sessions that can be established at different times. The sessions can be established based on a session control protocol such as, for example, SIP. In some embodiments, one or more session-layer parameter values can be determined based on information from one or more session-control-protocol packets. For example, a session-layer parameter value can be parsed from a request to establish a session associated with, for example, media signal 42 or media signal 44. The request can be defined in accordance with a session control protocol. In some embodiments, the session-layer parameter values can be received (e.g., received at the packet monitoring module 210) in response to a session being established.

Figure 4:
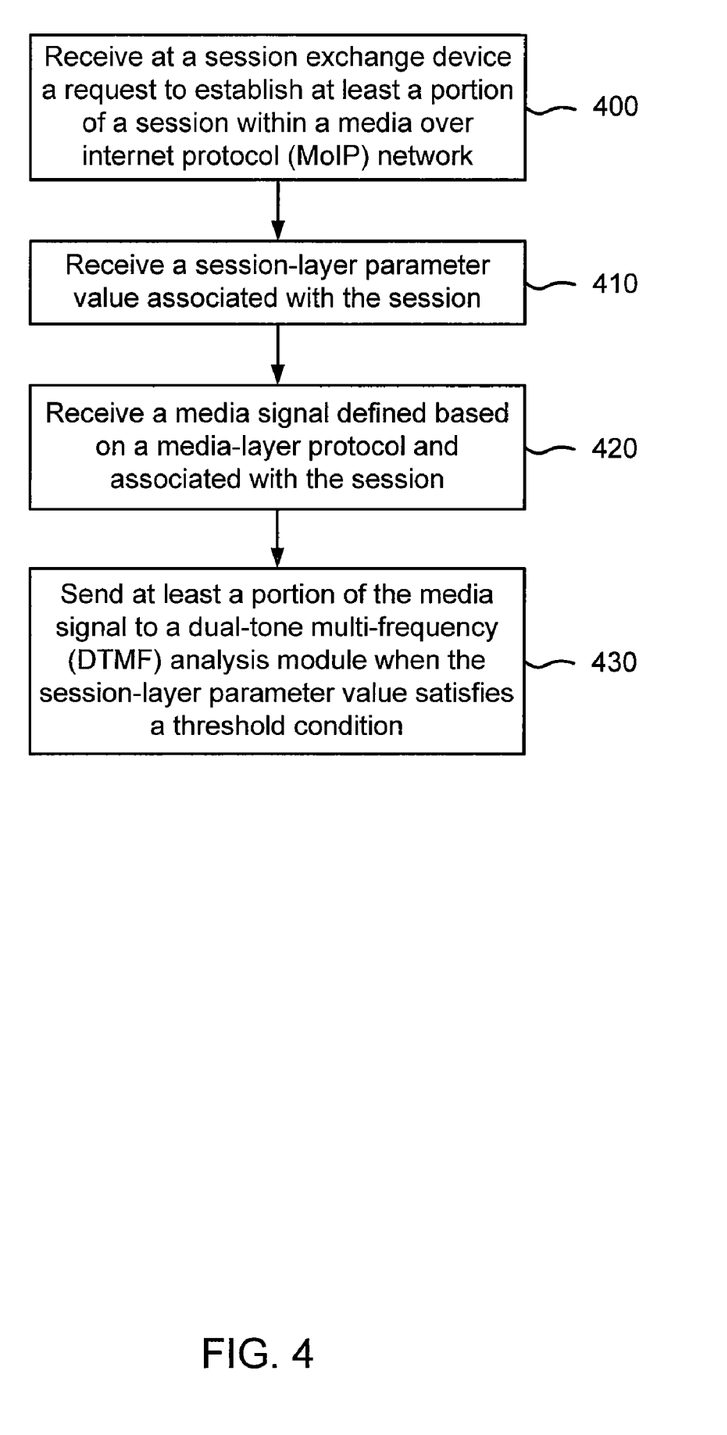
FIG. 4 is a flowchart that illustrates a method for determining whether to send at least a portion of a media signal to a DTMF analysis module based on a session-layer parameter value, according to an embodiment of the invention.

FIG. 4 is a flowchart that illustrates a method for determining whether to send at least a portion of a media signal to a DTMF analysis module based on a session-layer parameter value, according to an embodiment of the invention. As shown in the flowchart, a request to establish at least a portion of a session within a MoIP network is received at a session exchange device at 400. The request to establish at least a portion of the session can be referred to as a session request. The portion of the session can be an ingress portion of a session and the session request can be received at the session exchange device from, for example, a source device via a source network. The session request can be defined in accordance with a session control protocol. In response to the request to establish the portion of the session, a different session request to establish a different portion of the session (e.g., an egress portion of the session) can be defined at the session exchange device and sent from the session exchange device to, for example, a destination device via a destination network. In some embodiments, the session-layer parameter value can be associated with an egress portion of a session.

A session-layer parameter value associated with the session is received at 410. The session-layer parameter value can be extracted from, for example, the session request or a different session-control-protocol message associated with the session. In some embodiments, the session-layer parameter value can be determined/calculated based on one or more parameter values (e.g., an address value, a QoS parameter value) associated with a media signal associated with the session.

A media signal defined in accordance with a media-layer protocol and associated with the session is received at 420. The media signal can be received at the session exchange device. The media signal can be referred to as an incoming media signal or as an ingress media signal. The media signal can be associated with a stream of IP packets transmitted from and/or defined at a source device.

At least a portion of the media signal is sent to a DTMF analysis module when the session-layer parameter value satisfies a condition associated with a DTMF policy at 430. The portion of the media signal can be sent to the DTMF analysis module from a packet monitoring module after the packet monitoring module determines that the condition has been satisfied based on the session-layer parameter value. The condition can be included in a database that can be accessed by the packet monitoring module. For example, the condition can be included in one or more DTMF policies (such as those shown in FIG. 3) stored in the database.

Figure 5A:
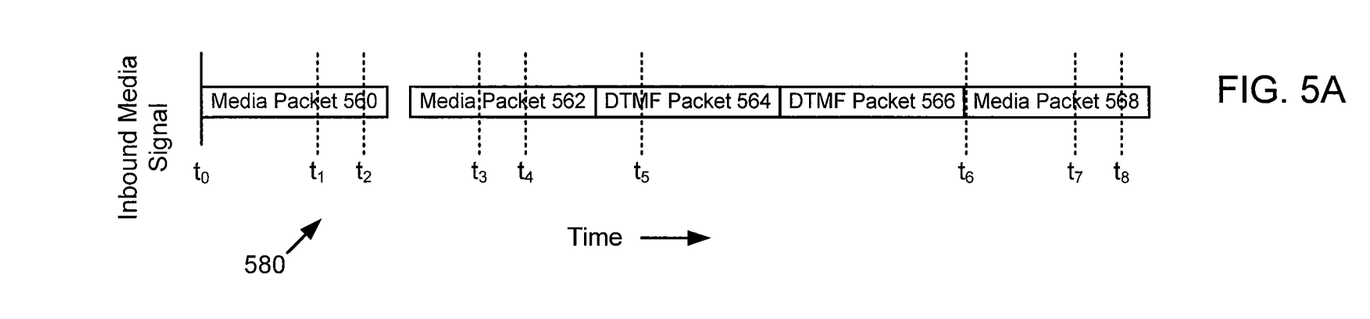
FIG. 5A is a schematic graph of an incoming media signal defined by a stream of packets, according to an embodiment of the invention.

FIG. 5A is a schematic graph of an incoming media signal defined by a stream of packets 580, according to an embodiment of the invention. As shown in FIG. 5A, time is increasing to the right. At least some of the packets from the stream of packets 580 have payloads that include media content associated with the media signal. The stream of packets 580 includes media packets 560, 562, and 568. The stream of packets 580 also includes DTMF packets 564 and 566, which are both inband DTMF packets. In some embodiments, the media packets 560, 562, and 568 can be referred to as non-DTMF packets.

The DTMF packets 564 and 566 each have a payload, a header, and a trailer. In this embodiment, the DTMF packets 564 and 566 have payloads that correspond to a single DTMF signal. In some embodiments, information associated with a DTMF signal can be included in any portion of a DTMF packet such as within a portion of a header and/or within a portion of a payload. The information can be, for example, DTMF parameters (or parameter values) that can be used to define the DTMF signal such as a duration of the DTMF signal, a frequency of the DTMF signal, a start/stop time of the DTMF signal (e.g., start/stop timestamp, DTMF stop event, DTMF start event), and so forth.

In some embodiments, a DTMF signal can be encoded as information such as a waveform in, for example, a payload of DTMF packet 566. For example, the waveform in a payload can be a digitized version of a tone for a specified duration (e.g., 5 seconds, 0.4 seconds). The tone can be, for example, a tone associated with the number 1 (e.g., combination of 697 Hz and 1209 Hz frequency tones) or a tone associated with the number 5 (e.g., combination of 770 Hz and 1336 Hz frequency tones). In some embodiments, the waveform can be any type of digitized waveform (e.g., mp3, wav) in an uncompressed or compressed format. The duration of the DTMF tone/signal can be, in some embodiments, defined by the length of the waveform within the payload.

In some embodiments, a DTMF signal can be described in both a header and a payload of the DTMF packet (such as DTMF packet 566). For example, a first portion of the DTMF signal can be defined in the header and a second portion of the DTMF signal can be defined in the payload. In some embodiments, for example, some DTMF parameters associated with the DTMF signal such as the duration of the DTMF signal can be described (e.g., included) in the header of the DTMF packet and the frequency of the DTMF signal can be included in the payload of the DTMF packet as a digitized waveform.

Although several examples of the types of information associated with a DTMF signal (e.g., DTMF parameters, digitized waveform) were described above, information associated with a DTMF signal can be defined and/or included in a DTMF packet in various other ways to describe any aspect/characteristic of a DTMF signal such that the DTMF signal can be processed by a session exchange device (e.g., the session exchange device 110 shown in FIG. 1). For example, DTMF parameters different than those described above can be defined and included in a DTMF packet as information associated with a DTMF signal. In some embodiments, information associated with a DTMF signal can be included in any portion of an IP packet (e.g., a portion of a trailer) that can be based on a specified protocol (e.g., a specified format, a specified synchronization, a specified syntax, a specified data transfer rule).

Figure 5B:
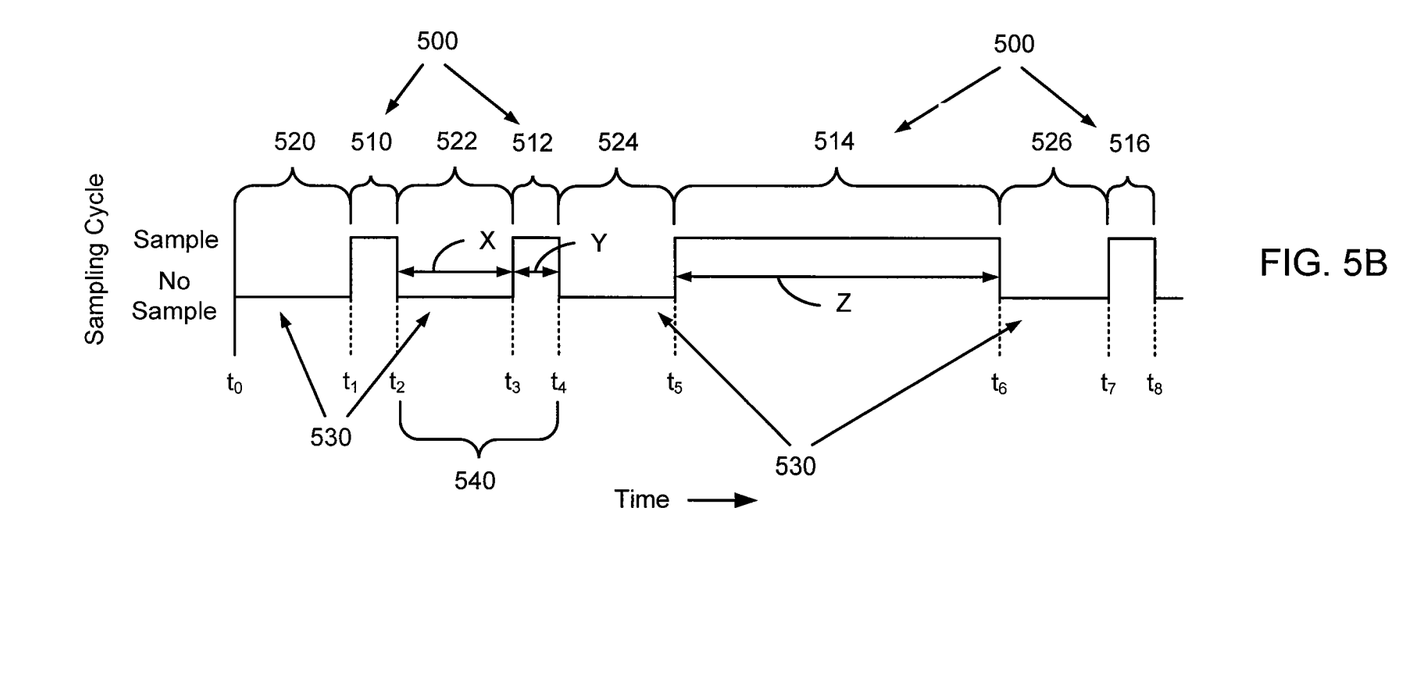
FIG. 5B is a schematic graph that illustrates a sampling cycle, according to an embodiment of the invention.

Portions of the stream of packets 580 (e.g., a portion of media packet 560) are sent to a DTMF analysis module (such as that shown in FIG. 1 and/or FIG. 2) for DTMF analysis based on the sampling cycle shown in FIG. 5B. More details related to the sampling cycle are discussed in connection with FIG. 5B.

FIG. 5B is a schematic graph that illustrates a sampling cycle, according to an embodiment of the invention. As shown in FIG. 5B, time is increasing to the right and the individual time indicators (e.g., $t_1$ $t_2$) shown in FIG. 5B correspond with the times shown in FIG. 5A. Time period 510 (between times $t_1$ and $t_2$), time period 512 (between times $t_3$ and $t_4$), time period 514 (between times $t_5$ and $t_6$), and time period 516 (between times $t_7$ and $t_8$) can be referred to as sampling time periods 500. Time period 520 (between times $t_0$ and $t_1$), time period 522 (between times $t_2$ and $t_3$), time period 524 (between times $t_4$ and $t_5$), and time period 526 (between time $t_6$ and $t_7$) can be referred to as non-sampling time periods 530. In this embodiment, the non-sampling time periods 530 have substantially the same duration. The sampling time period 514 has a duration of Z, which is longer than the sampling time periods 510, 512, and 516. The sampling time periods 510, 512, and 516 have substantially the same duration of Y. In this embodiment, duration Y is a default sampling duration.

During the sampling time periods 530 (starting at times $t_1$, $t_3$, $t_5$, and $t_7$), samples (e.g., portions) of the stream of packets 580 (shown in FIG. 5A and corresponding to sampling time period 530) are sent to a DTMF analysis module for DTMF analysis. For example, a sample of the stream of packets 580 (shown in FIG. 5A) can be sent to the DTMF analysis module for DTMF analysis between time $t_1$ and $t_2$ according to the sampling cycle. Specifically, a portion of media packet 560 shown in FIG. 5A (between times $t_1$ and $t_2$) is sent. In some embodiments, the stream of packets 580 (e.g., the media signal) can be routed to the DTMF analysis module during sampling time period 530. In this embodiment, a duty cycle, which can be a duration of a non-sampling time period 530 plus a duration of a sampling time period 500, of the sampling cycle is shown at 540. In this embodiment, the duty cycle 540 includes the default sampling duration of Y and a default non-sampling time duration of X.

The duration of the sampling time period 514 (shown as Z) is longer than the default sampling duration of Y because at time $t_5$ (or shortly after time $t_5$) a portion of the DTMF packet 564 is identified as being associated with a DTMF signal. In response, the duration of the sampling time period 514 is increased beyond the default sampling time duration so that the end of the DTMF signal (portions of which are included in both DTMF packets 564 and 566) can be detected. In other words, a larger sample of the stream of packets 580 is sent to the DTMF analysis module when at least a portion of a DTMF signal is detected in DTMF packet 564. Said differently, the stream of packets 580 (e.g., the media signal) is routed to the DTMF analysis module for DTMF analysis until the end of the DTMF signal (or beginning portion of a non-DTMF packet) is detected.

As shown in FIG. 5B, when the end of DTMF packet 566 is detected, sampling of the stream of packets 580 is resumed based on the default duty cycle (e.g., duty cycle shown at 540 and with respect to the time period between times $t_6$ and $t_8$). In some embodiments, sampling of the stream of packets 580 can be performed based on the default duty cycle when media packet 568 (a non-DTMF packet) is detected. In some embodiments, sampling of the stream of packets 580 can commence based on the default duty cycle when the end of the DTMF signal associated with the DTMF packets 564 and 566 is detected.

In yet other embodiments, rather than routing the stream of packets 580 to the DTMF analysis module, a module (e.g., a packet monitoring module such as that shown in FIG. 2) associated with the DTMF analysis module can be configured to obtain a portion of (or a copy of a portion of) the stream of packets 580 during a sampling time period 530 and send that portion to the DTMF analysis module for DTMF analysis. For example, if the default sampling duration is 5 milliseconds (ms), the module associated with the DTMF analysis module can be configured to send a 5 ms portion of the stream of packets 580 to the DTMF analysis module. If a DTMF packet, such as DTMF 564 is detected, the module associated with the DTMF analysis module can be configured to continuously send 5 ms portions of the stream of packets 580 until the end of the DTMF signal (or beginning portion of a non-DTMF packet) is detected.

In some embodiments, information related to detection of the DTMF signal within DTMF packet 564 can be communicated via a feedback signal to, for example, a packet monitoring module (such as that shown in FIG. 2). The packet monitoring module can be configured to increase the total sampling time period of the media signal in response to the feedback signal by routing the media signal to the DTMF analysis module until the end of the DTMF signal is detected. In some embodiments, parameter values associated with the sampling cycle (e.g., duty cycle parameter values) can be stored in a memory where they can be accessed and used by a DTMF analysis module and/or a DTMF management module.

In some embodiments, the duty cycle of the sampling cycle can be defined based on, for example, a specification (e.g., a protocol) associated with a DTMF signal. For example, if a minimum duration of a DTMF signal is relatively long as defined within the specification, a non-sampling time period can be defined so that the DTMF signal will be detected (e.g., not missed) during the sampling time period. For example, if the minimum duration of a DTMF signal is 50 ms as defined by a particular protocol, the non-sampling time period should be less than the minimum duration so that a 50 ms DTMF signal will not go undetected during the non-sampling time period.

In some embodiments, any portion of the duty cycle of the sampling cycle can be defined based on, for example, a duration of a frame (e.g., a frame rate) associated with a protocol associated with (e.g., used to define) the media signal (e.g., the stream of packets 580). For example, if a frame rate of the stream of packets 580 is 20 ms as defined by a media-layer protocol associated with the stream of packets 580, the duty cycle of the sampling cycle can be defined so that every packet from the stream of packets 580 will be analyzed by the DTMF analysis module. In some embodiments, the duty cycle (which can include a non-sampling time period and a sampling time period) can be defined to have a duration less then 20 ms.

In yet other embodiments, the sampling time period within a duty cycle such as a default duty cycle can be defined based on a specification (e.g., a limitation) associated with the DTMF analysis module. For example, if the DTMF analysis module is configured to analyze a sample from the stream of packets 580 that has at least a specified duration (e.g., a minimum duration, a maximum duration), the duty cycle can be defined accordingly. In other words, the sampling time period and/or non-sampling time period associated with a duty cycle can be defined to satisfy one or more limitations associated with the DTMF analysis module.

In some embodiments, the duty cycle for sampling a media signal can be defined based on a session-layer parameter value. For example, a duty cycle can be selected from a library of duty cycles based on a session-layer parameter value associated with a media signal and/or a session associated with the media signal. The duty cycle can be selected based on a condition being satisfied within a DTMF policy. In some embodiments, one or more sampling time periods associated with, for example, a default duty cycle can be skipped based on a session-layer parameter value.

Figure 6:
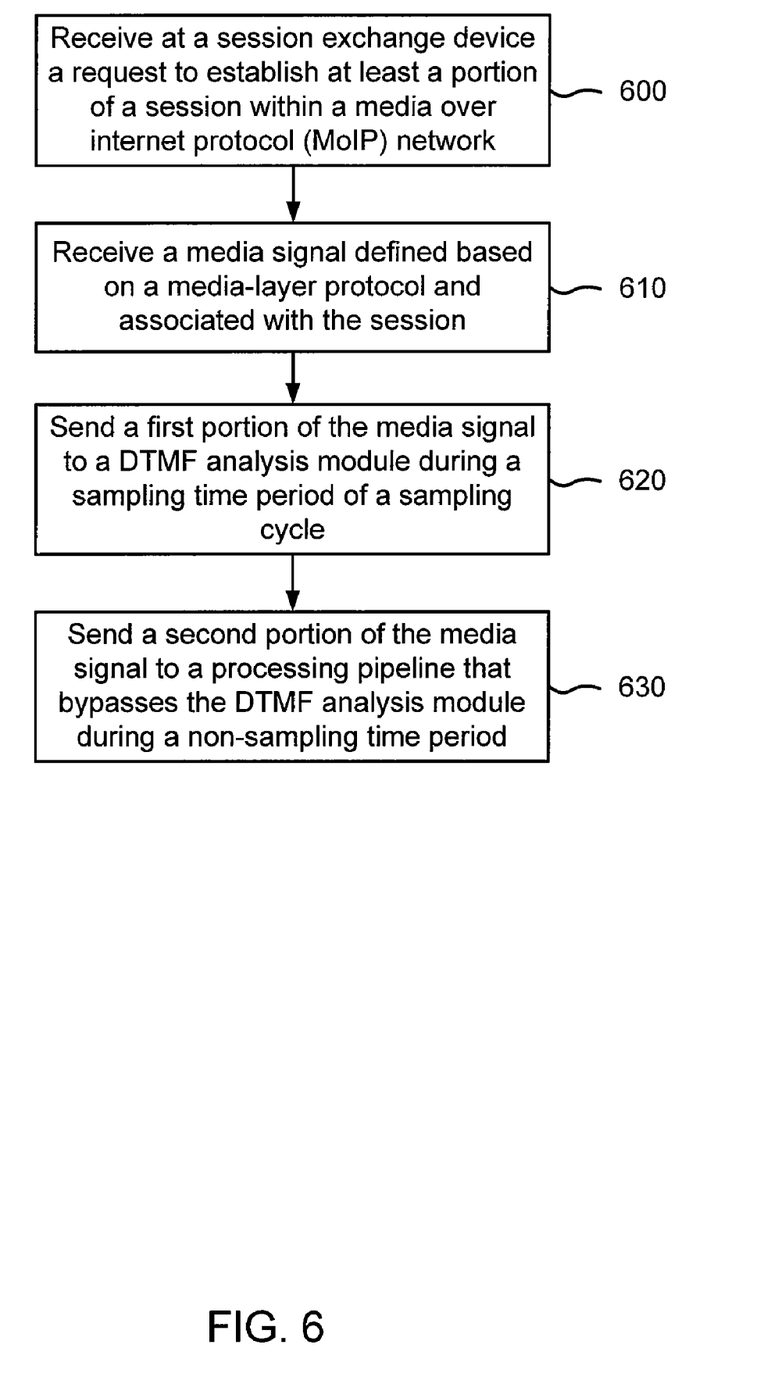
FIG. 6 is a flowchart that illustrates a method for sampling a media signal based on a sampling cycle, according to an embodiment of the invention.

FIG. 6 is a flowchart that illustrates a method for sampling a media signal based on a sampling cycle, according to an embodiment of the invention. As shown in the flowchart, a request to establish at least a portion of a session within a MoIP network is received at a session exchange device at 600. The session request can be defined based on a session control protocol (e.g., SIP).

A media signal defined in accordance with a media-layer protocol and associated with the session is received at 610. The media signal can be defined at and/or sent from a source device after the session has been established.

A first portion of the media signal is sent to a DTMF analysis module during a sampling time period of a sampling cycle at 620. In some embodiments, the first portion of the media signal can be sent to the DTMF analysis module based on a default duty cycle associated with the sampling cycle. In some embodiments, the first portion of the media signal can be sent to the DTMF analysis module only when a DTMF policy is satisfied based on a session-layer parameter value associated with the media signal.

A second portion of the media signal is sent to a processing pipeline that bypasses the DTMF analysis module during a non-sampling time period at 630. In some embodiments, the second portion of the media signal can be routed to bypass the DTMF analysis module based on a default duty cycle associated with the sampling cycle.

Figure 7:
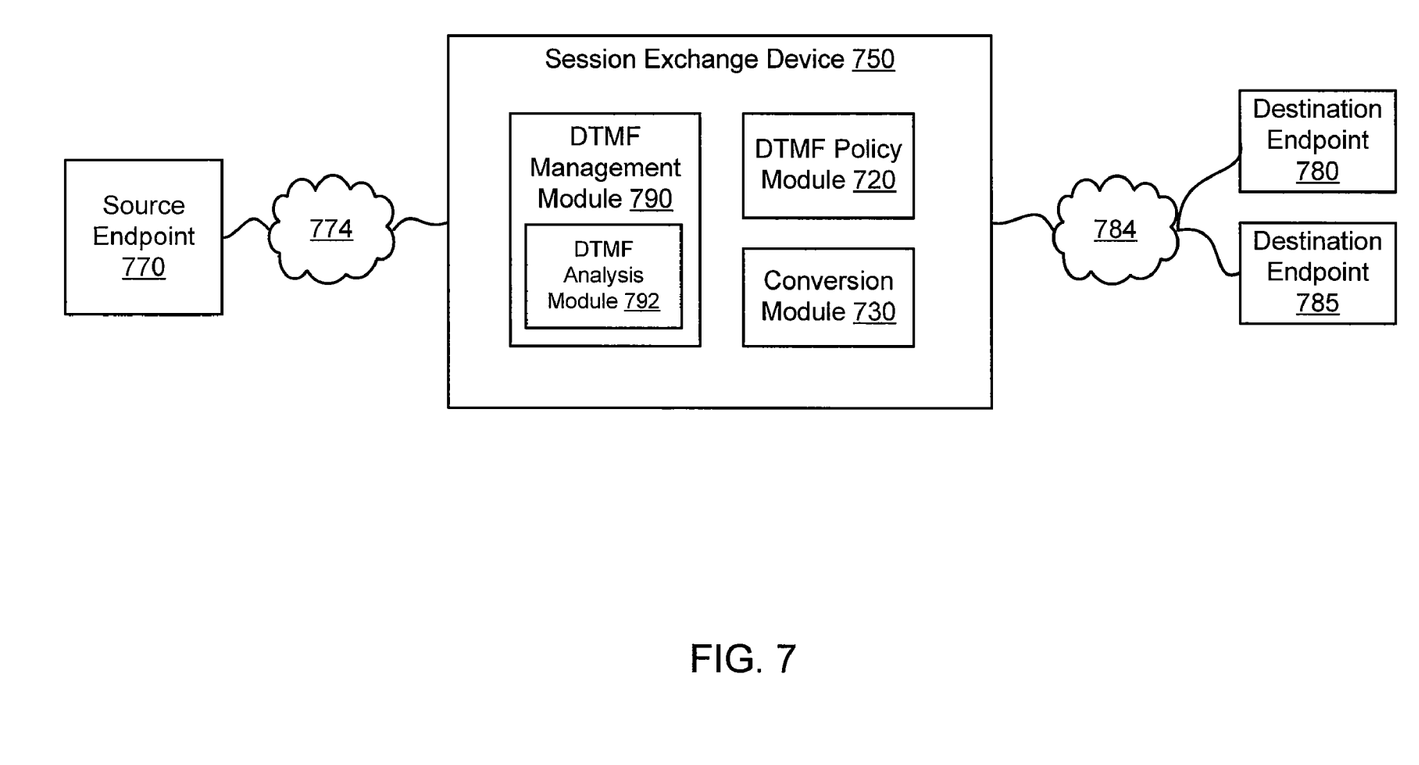
FIG. 7 is a schematic diagram that illustrates a DTMF management module associated with a session exchange device, according to an embodiment of the invention.

FIG. 7 is a schematic diagram that illustrates a DTMF management module 790 associated with a session exchange device 750, according to an embodiment of the invention. In this embodiment, the DTMF management module 790 includes a DTMF analysis module 792 configured to analyze one or more incoming media signals to determine whether or not the media signal(s) have information associated with a DTMF signal. If the DTMF analysis module 792 determines that the media signal(s) has information associated with a DTMF signal, a policy module 720 and a conversion module 730 can be configured to translate (e.g., to convert) at least some portions of the media signal(s) associated with the DTMF signal from a first media-layer protocol into a second media-layer protocol.

In this embodiment, the DTMF management module 790 is configured to receive a media signal addressed to either destination endpoint 780 or destination endpoint 785, and sent from a source endpoint 770. After processing the media signal, the session exchange device 750 is configured to send the media signal to destination endpoint 780 or 785 (depending on the destination address). The media signal is sent to and from the session exchange device 750 via networks 774 and 784, respectively. More details regarding media signal conversion are set forth in co-pending U.S. patent application Ser. No. 11/771,270, filed on Jun. 29, 2007, and entitled "Methods and Apparatus for Dual-Tone Multi-Frequency Signal Conversion within a Media Over Internet Protocol Network," which is incorporated herein by reference in its entirety.

Some embodiments relate to a computer storage product with a computer-readable medium (also can be referred to as a processor-readable medium) having instructions or computer code thereon for performing various computer-implemented operations. The media and computer code (also can be referred to as code) may be those specially designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as floptical disks; carrier wave signals; and hardware devices that are specially configured to store and execute program code, such as ASICs, Programmable Logic Devices (PLDs), and Read-Only Memory (ROM) and Random-Access Memory (RAM) devices. Examples of computer code include, but are not limited to, micro-code or micro-instructions, machine instructions, such as produced by a compiler, and files containing higher-level instructions that are executed by a computer using an interpreter. For example, an embodiment of the invention may be implemented using Java, C++, or other object-oriented programming language and development tools. Additional examples of computer code include, but are not limited to, control signals, encrypted code, and compressed code.

In conclusion, among other things, methods and apparatus for DTMF signal processing within a MoIP network are described. While various embodiments have been described above, it should be understood that they have been presented by way of example only, and various changes in form and details may be made. For example, a first session exchange device can be configured to trigger a downstream second session exchange device to perform DTMF analysis of a media signal.

What is claimed is:

1. A method, comprising:
receiving a packet-based media signal associated with a session within a media over internet protocol (MoIP) network, the packet-based media signal being defined based on a media-layer protocol;
receiving a session-layer parameter value associated with the packet-based media signal;
sending, when a condition is satisfied based on the session-layer parameter value, at least a first portion of the packet-based media signal to a dual-tone multi-frequency (DTMF) analysis module to determine if the packet-based media signal includes DTMF signal information; and
sending a second portion of the packet-based media signal to a processing pipeline that bypasses the DTMF analysis module when the condition is unsatisfied based on the session-layer parameter value.

2. The method of claim 1, wherein the session is established in response to a session request defined based on a session-layer protocol associated with a signaling layer of the MoIP network, the session-layer parameter value is associated with the signaling layer.

3. The method of claim 1, wherein the session-layer parameter value is an identifier associated with a destination endpoint configured to receive the packet-based media signal.

4. The method of claim 1, wherein the first portion of the packet-based media signal is defined based on a sampling time period associated with the DTMF analysis module.

5. The method of claim 1, wherein the receiving includes receiving a first packet associated with the packet-based media signal, the media-layer protocol is a first media-layer protocol, the first packet is defined based on the first media-layer protocol, the method further comprising:
receiving an indicator from the DTMF analysis module based on a DTMF conversion policy; and
defining a second packet based on the first packet and based on a second media-layer protocol in response to the indicator.

6. The method of claim 1, wherein at least a portion of the session is established based on a session request defined at a session exchange device.

7. A method, comprising:
receiving a packet-based media signal associated with a session established based on a session request, the session request being defined at a session exchange device associated with a MoIP network;
sending a first portion of the packet-based media signal to a DTMF analysis module to determine if the packet-based media signal includes DTMF signal information during a sampling time period after a non-sampling time period;
determining at the DTMF analysis module during a portion of the sampling time period that the first portion of the packet-based media signal is a DTMF signal;
increasing the sampling time period until the end of the DTMF signal; and
processing a second portion of the packet-based media signal at a processing pipeline that bypasses the DTMF analysis module during the non-sampling time period.

8. The method of claim 7, wherein at least one of the sampling time period or the non-sampling time period is defined based on at least one of a frame rate associated with a media-layer protocol or a minimum DTMF tone duration.

9. The method of claim 7, wherein the portion of the packet-based media signal is a first portion of the packet-based media signal, the method further comprising:
sending a second portion of the packet-based media signal to the DTMF analysis module when the first portion of the packet-based media signal is a portion of a DTMF packet, the second portion of the packet-based media signal being adjacent to the first portion of the media signal without an intervening non-DTMF packet and being after the first portion of the packet-based media signal.

10. The method of claim 7, wherein the sampling time period and the non-sampling time period are associated with a sampling cycle.

11. The method of claim 7, wherein at least one of the sampling time period or the non-sampling time period is defined based on at least one of a frame rate associated with a media-layer protocol or a minimum DTMF tone duration.

12. An apparatus, comprising:
a DTMF monitoring module configured to receive a packet-based media signal associated with a MoIP network;
a DTMF analysis module configured to analyze a first portion of a non-DTMF packet associated with the packet-based media signal to determine if the packet-based media signal includes DTMF signal information based on a sampling cycle after an end portion of a DTMF packet associated with the packet-based media signal is detected, wherein the sampling cycle includes a sampling time period and a non-sampling time period, wherein, in response to detecting a DTMF signal, the sampling time period is increased until the end of the DTMF signal;
a processing pipeline portion that excludes the DTMF analysis module, the DTMF monitoring module being configured to send a second portion of the non-DTMF packet to the processing pipeline portion; and
at least one processor, wherein at least one of the DTMF monitoring module and the DTMF analysis module is executable by the at least one processor.

13. The apparatus of claim 12, wherein at least a portion of the DTMF analysis module is a software-based digital-signal-processor (DSP) emulator associated with a media subsystem of a session border controller.

14. The apparatus of claim 12, wherein the DTMF analysis module is configured to analyze the portion of the non-DTMF packet during the sampling time period and not during the non-sampling time period.

15. The apparatus of claim 12, wherein the end portion of the DTMF packet is associated with a payload of the DTMF packet.

16. The apparatus of claim 12, wherein the DTMF packet is a first DTMF packet defined based on a media-layer of the MoIP network, the first DTMF packet having a payload associated with at least a portion of a DTMF signal, the apparatus further comprising:
a DTMF conversion module configured to define a second DTMF packet based on a session-layer of the MoIP network, the second DTMF packet having at least one of a payload or a header associated with the portion of the DTMF signal, wherein the DTMF conversion module is a hardware-based module.

17. The apparatus of claim 12, wherein the end portion of the DTMF packet is analyzed by the DTMF analysis module in response to a beginning portion of the DTMF packet being detected at the DTMF analysis module.

* * * * *